United States Patent
Teodor et al.

(10) Patent No.: US 12,141,243 B2
(45) Date of Patent: Nov. 12, 2024

(54) CRYPTOGRAPHICALLY GENERATED DATA TETHERED TO BIOLOGICAL DATASET PROVIDED BY A USER THROUGH SYNCHRONIZATION OVER PEER-TO-PEER NODES

(71) Applicant: Veiovia Ltd., York (GB)

(72) Inventors: Roxana Iuliana Teodor, York (GB); Peter Damian Ashton, York (GB); Remy Lyon, New York, NY (US); Siamak Fayyaz Shahandashti, Newcastle upon Tyne (GB)

(73) Assignee: Veiovia Ltd. (GB)

( * ) Notice: Subject to any disclaimer, the term of this patent is extended or adjusted under 35 U.S.C. 154(b) by 0 days.

(21) Appl. No.: 17/705,560

(22) Filed: Mar. 28, 2022

(65) Prior Publication Data
US 2023/0308301 A1 Sep. 28, 2023

(51) Int. Cl.
*G06F 21/00* (2013.01)
*G06F 21/10* (2013.01)
*H04L 9/00* (2022.01)
*H04L 9/08* (2006.01)
*H04L 9/32* (2006.01)

(52) U.S. Cl.
CPC .......... *G06F 21/10* (2013.01); *H04L 9/0866* (2013.01); *H04L 9/3263* (2013.01); *H04L 9/50* (2022.05); *G06F 21/1085* (2023.08); *H04L 2209/56* (2013.01)

(58) Field of Classification Search
CPC ....... H04L 9/50; H04L 9/0866; H04L 9/3263; H04L 63/0823; H04L 2209/56; G06F 21/10; G06F 2221/0788
See application file for complete search history.

(56) References Cited

U.S. PATENT DOCUMENTS 11,341,267 B1 5/2022 Haverlah et al.
11,416,942 B1 * 8/2022 Leise .................. G07C 5/0866
(Continued)

FOREIGN PATENT DOCUMENTS

WO 2021025222 A1 2/2021

OTHER PUBLICATIONS

Atalay Ileri, Coinami: A Cryptocurrency with DNA sequence Alignment as Proof-of-Work, 2016, Department of Computer Engineering, Bilkent University, Ankara, Turkey, pp. 1-12 (Year: 2016).*
(Continued)

*Primary Examiner* — Kevin Ayala
(74) *Attorney, Agent, or Firm* — Baker Botts L.L.P.

(57) ABSTRACT

A method for minting cryptographically generated data includes sending a biological dataset to a certifier, where the certifier is trusted by nodes of a blockchain network. A unique identifier of each of one or more contributors is sent to the certifier, wherein each contributor is a user that contributed to the provision of the biological dataset. A corresponding claim certificate is received, each claim certificate associating the identifier of the corresponding contributor with an anonymous credential of that contributor and a dataset identifier for uniquely identifying the biological dataset, each claim certificate signed by the certifier. One or more contribution messages are communicated to a mint directly or indirectly.

14 Claims, 7 Drawing Sheets

(56) References Cited

U.S. PATENT DOCUMENTS

| | | | | |
|---|---|---|---|---|
| 2016/0330034 A1* | 11/2016 | Back | ................... | G06Q 20/065 |
| 2018/0262493 A1* | 9/2018 | Andrade | .................. | G06F 21/31 |
| 2018/0365446 A1* | 12/2018 | Alves De Carvalho | ..................... | G16B 50/30 |
| 2019/0026425 A1* | 1/2019 | Downs | ................... | G16H 50/30 |
| 2019/0303846 A1 | 10/2019 | Kaweske et al. | | |
| 2020/0028697 A1 | 1/2020 | Unger et al. | | |
| 2020/0073798 A1 | 3/2020 | Cho | | |
| 2020/0145219 A1 | 5/2020 | Sebastian et al. | | |
| 2020/0412546 A1* | 12/2020 | Larmuseau | ........... | H04L 9/3247 |
| 2021/0150521 A1* | 5/2021 | Pan | ........................ | G06Q 30/06 |
| 2022/0036366 A1 | 2/2022 | Wu | | |
| 2022/0092566 A1 | 3/2022 | Austring et al. | | |
| 2022/0208315 A1* | 6/2022 | Strohl | ................... | G16H 10/40 |
| 2022/0255761 A1* | 8/2022 | Larmuseau | ........... | G16B 50/40 |
| 2022/0366442 A1 | 11/2022 | Cho et al. | | |

OTHER PUBLICATIONS

Office action Summary mailed Jul. 28, 2022, U.S. Appl. No. 17/705,548, filed Mar. 28, 2022, 19 pages.
Notice of allowance and fees due in U.S. Appl. No. 17/705,525, filed Mar. 28, 2022, 15 pages.
Patents Act 1977: Combined Search and Examination Report under Sections 17 and 18(3), Application GB2204375.6, mailed Aug. 31, 2022, 8 pages.

\* cited by examiner

CRYPTOGRAPHICALLY GENERATED DATA TETHERED TO BIOLOGICAL DATASET PROVIDED BY A USER THROUGH SYNCHRONIZATION OVER PEER-TO-PEER NODES

TECHNICAL FIELD

The present disclosure relates to blockchain implementations, with a particular focus on methods of minting new units of cryptographically generated data.

BACKGROUND

A blockchain, sometimes known as a distributed ledger or a distributed consensus ledger, is a type of distributed database. A blockchain comprises a plurality of blocks, also known as block records or data structure blocks. Each time a new block containing a new entry or set of new entries is added to the blockchain, the information is duplicated and distributed across nodes of the blockchain network. Each node can independently verify that the new block is valid before updating their respective locally stored copies of the blockchain, or can disregard the new block if evidence of its validity cannot be verified. In this way, when a valid update is made, the state of the blockchain is updated at all nodes of the blockchain network by consensus.

The integrity of information stored in the blockchain is ensured because validly added blocks are duplicated across the nodes of the blockchain network, and because each block typically contains a strong link to a preceding block, for example, a hash value of the information in the preceding block or a hash value of a header of the previous block. In this way, once validated by the nodes of the blockchain network, a block will be linked to a preceding block and, through that preceding block, to each earlier block in turn back to a genesis block—the only block which does not contain a link to a previous block. In order to tamper with information in any particular block of the blockchain, a tampering party would have to undertake the computationally intensive task of storing that tampered block and any subsequent blocks that need to be chained to that tampered block on the blockchain while also trying to both fool the majority of honest nodes on the network that such updates are valid and compete with the computational resources of those honest nodes to add further blocks.

Blockchains are suitable for storing any information, for example data and/or computer-executable instructions (often referred to as a "smart contract"—function calls to the computer-executable instructions stored on the blockchain can be used to initiate a computer-executable process). However, as blockchains enable the tamper-resistant and decentralised storage of data, they have been found to be particularly useful for managing cryptographically generated data.

Cryptographically generated data can typically be characterised by the consensus mechanism used in the blockchain to verify that blocks are valid. The most well-known consensus mechanisms are Proof of Work, Proof of Stake, and Proof of Authority.

Proof of Work-based cryptographically generated data, such as Bitcoin, rely on nodes of the blockchain network solving a hard computational problem to add a block to the blockchain and to provide verifiable evidence that the computational problem was solved in order to build consensus on the state of the blockchain. This process is often referred to as "mining"—mining nodes work to maintain the system by validating transactions (by appending blocks to the blockchain) and newly minted tokens are assigned to the mining node that solves the computational problem. This incentive mechanism has led to a hardware race that has resulted in enormous energy demands, and mining has now become feasible only to those who can afford to pay for powerful specialist cryptotoken mining hardware. New users are unable to receive newly minted tokens without powerful mining hardware, and so can often only access tokens of a cryptographically generated data by exchanging fiat currency at exchanges, which are often unregulated and therefore may not be trustworthy. Furthermore, this pressure leads to surges and high volatility in the exchange rates for such cryptographically generated data, which in turn incentivises participants in the network to hoard tokens. In some Proof of Work-based cryptographically generated data including Bitcoin, this pressure is made worse by a fixed cap on the supply of new tokens.

Proof of Stake-based cryptographically generated data rely on the rationality of a stakeholder in the system to behave honestly or risk devaluing the cryptographically generated data. Users stake some quantity of their holdings in the cryptographically generated data to become a validator, responsible for ordering transactions and making new blocks so that all nodes can agree on the state of the cryptographically generated data. A validator may be chosen at random and in proportion to their stake to create a new block and otherwise may merely validate other blocks of the blockchain. The validator's stake is used to incentivise good behaviour, and newly minted tokens may be assigned to the validator creating the block. However, in Proof of Stake-based systems, the stakeholders are incentivised to hold their stake in order to maximise their probability of being the validator chosen to create the next block and therefore to collect the newly minted tokens.

Although in Proof of Work-based systems any node can be a miner and hence a validator, in Proof of Authority-based blockchain systems, only a limited number of nodes are designated as validators that can append blocks to the blockchain. Validators are either selected and acquire their authority through processes external to the blockchain or are elected by the nodes. Since the integrity of the blocks appended by the validators to the blockchain can be verified publicly by any node, Proof of Authority systems follow a 'trust but verify' model. Validators that perform their tasks appropriately are provided newly minted tokens, whereas those found not doing so will suffer a reputation damage, usually facilitated through a transparent reputation system. Hence validators have an incentive to follow the specified protocols. Trust is distributed between the validators, hence the larger the set of validators and the more diverse they are, the higher the trust in the system. There is no need for computationally expensive Proof of Work problems to be solved to probabilistically select an appender as the validators can simply go in turn to append blocks which also prevents any of them having the power to append multiple consecutive blocks. In summary, compared to Proof of Work-based systems, Proof of Authority systems have higher trust assumptions as the nodes need to trust the validators, but have almost no computational (and hence energy) waste and are usually more scalable as there is no requirement to wait for a Proof of Work computational problem to be solved for a new block to be added to the blockchain and blocks can be added almost immediately.

There is no unified solution for the introduction of newly minted cryptotokens to a network. The problem of devising a secure minting mechanism shares similar challenges to those that arise in devising a secure consensus mechanism, and so it is no surprise that minting mechanisms are typically intrinsically linked to blockchain consensus mechanisms. For example, in a minting mechanism, one must be able to prevent so-called Sybil attacks, in which a malicious user spawns multiple peer identities in order to compromise a disproportionate share of the network.

In part to counteract such attacks, traditional cryptographically generated data have fully integrated the distribution of new tokens with the consensus mechanism underlying the blockchain supporting the cryptographically generated data—in a Proof of Work system the mining node that creates a valid new block is provided with the new token, and in a Proof of Stake system the validator selected to create the new block is provided with the new token. This inherently incentivises the hoarding of coins and can lead to deflation and volatility in the cryptographically generated data.

SUMMARY

The inventors have recognised that the minting mechanism by which new cryptotokens are introduced to a network need not be linked entirely to the consensus mechanism by which nodes of a blockchain network validate transactions. The methods described herein may be used to introduce cryptotokens irrespective of the consensus mechanism used by the underlying blockchain. For example, the methods described herein may be used in conjunction with a Proof of Authority-based consensus mechanism, Proof of Work-based consensus mechanism or a Proof of Stake-based consensus mechanism. Furthermore, by somewhat decoupling the minting mechanism from the consensus mechanism, cryptotokens are available to new users of the cryptographically generated data and the incentives for hoarding are somewhat diminished.

The cryptographically generated data described herein is tethered to biological data—users that contribute to the provision of a biological dataset are allocated a portion of a newly minted quantity of the cryptographically generated data. The value of the newly minted quantity of the cryptographically generated data is linked to the quality of the biological dataset provided. In particular examples, the biological datasets may be genetic sequences. On an economic level, linking the amount of cryptographically generated data in circulation to biological datasets is likely to lead to a low inflationary pressure on the value of the cryptographically generated data in circulation, in stark contrast to the deflationary pressures that face cryptographically generated data in which the minting mechanism is linked entirely to the consensus mechanism.

Furthermore, by linking cryptotokens to biological datasets, it is ensured that providers of biological data are compensated.

The systems, computing apparatus and methods described herein may be applied in a wide range of practical applications. Among many practical applications, a blockchain facilitates information sharing and asset management throughout decentralization, negating the need for a central entity. Without the need for a central entity, there may be a reduction in the cost burden associated with maintaining that central entity. The systems, computing apparatus and methods disclosed herein can improve current data transmission technology by providing additional security of data object transmission through specific biological dataset supplied by a user. This serves to decouple the minting process of newly generated cryptographically generated data from the typical consensus mechanism used throughout the blockchain network, thereby reducing the energy demand from the hardware used specifically for that consensus mechanism.

As used in the present specification and in the appended claims, the terms "node" or "computing device" or "computing apparatus" are meant to be understood broadly as any hardware device, virtual device, group of hardware devices, group of virtual devices, or combination thereof within a network. Nodes may include, for example, servers, switches, data processing devices, data storage devices, load balancers, routers, and virtual embodiments thereof, among many other types of hardware and virtual devices.

The term "blockchain network" as used herein is intended to be understood broadly to mean the nodes which take part in the sharing, storing and/or establishment of the blockchain. Nodes of a blockchain network are those entities that determine whether a new block meets the validity requirements to be appended to the blockchain and, if so, update any local copy of the blockchain and communicate the new block to other nodes of the blockchain network.

The terms "user", "participant in cryptographically generated data" and similar as used herein are intended to be understood broadly as an entity such as a person, company, research institution or other organisation that engages or seeks to engage with cryptographically generated data, and includes any digital identities associated with that entity. For example, a contributor providing biological data in order to receive an allocation of newly minted tokens is to be considered as a user even if they are not in possession of any cryptotokens until after a minting method as described herein has been performed, and that user's device is similarly to be considered as a "user device". Language such as "cryptographically generated data allocation information indicating participants in the cryptographically generated data to which at least a portion of the new unit of cryptographically generated data is allocated" may be understood broadly to mean information indicating a digital identity of the participant concerned, a digital folder number of that participant, or other such indicator.

The terms "user device", "participant device" and similar as used herein are intended to be understood broadly as a device through which a participant/user of the cryptographically generated data or intended participant/user of the cryptographically generated data may conduct transactions with the cryptographically generated data. A user device may include for example a digital folder module providing functionality for storing the credentials of a user associated with the user device, and may include for example a client application for enabling the user to conduct transactions using the stored credentials. A user device may be any computing device suitable for enabling a user to engage with the cryptographically generated data, such as a smart phone, a personal computer, a tablet, or a server. It is to be understood that a user device may or may not also be a node of the blockchain network, and similarly, a node of the blockchain network may or may not be a user device.

As described further above, a blockchain may support cryptographically generated data, in that blocks of the blockchain may store records of transactions taking place between digital folders of users, such as digital wallets, using tokens of the cryptographically generated data. In embodiments, the term "cryptographically generated data" may refer to a cryptocurrency, which is a digital currency that facilitates the exchange of value by transfer of cryptotokens between network participants and that is secured using cryptographic methods. Blocks of the blockchain may store transaction data and can be used to show a complete history of the tokens as they are transferred between participants in the cryptographically generated data.

According to an aspect of the invention, a method is provided for appending a minting block to a blockchain supporting a cryptographically generated data synchronization over peer-to-peer nodes. The method comprises verifying that one or more contribution messages have been communicated, the one or more contribution messages for indicating that one or more participants in the cryptographically generated data have contributed to the provision of a biological dataset. Each of the one or more contribution messages comprises a dataset identifier for uniquely identifying the biological dataset, and an anonymous credential of a contributor that contributed to the provision of the biological dataset. The method further comprises verifying that a certifier has communicated a quality certification message, the quality certification message signed by the certifier and comprising (i) the dataset identifier, (ii) one or more anonymous credentials of a corresponding one or more contributors, and (iii) one or more quality parameter values, the quality parameter values indicating a quality of the biological dataset. The method further comprises creating a minting block for establishing a new quantity of the cryptographically generated data. The minting block comprises (i) the dataset identifier, (ii) the one or more anonymous credentials determined from the quality certification message, (iii) the one or more quality parameter values, (iv) a carat status indicating a value of the new quantity of cryptographically generated data, the carat status determined at least in part from the one or more quality parameter values, and (v) cryptographically generated data allocation information, the cryptographically generated data allocation information indicating participants in the cryptographically generated data to which at least a portion of the new quantity of cryptographically generated data is allocated, the indicated participants comprising the one or more contributors. The method further comprises causing the minting block to be appended to the blockchain.

Each contribution message may be communicated as a block on the blockchain. Verifying that the one or more contribution messages have been communicated may comprise accessing the blockchain.

Verifying that the one or more contribution messages have been communicated may comprise receiving the one or more contribution messages off-chain.

The quality certification message may be communicated as a block of the blockchain. Verifying that a certifier has communicated a quality certification message may comprise accessing the blockchain.

Verifying that a certifier has communicated a quality certification message may comprise receiving the quality certification message from the certifier off-chain.

Verifying that a certifier has communicated a quality certification message may further comprise verifying the qualification certification message was communicated subsequent to the one or more contribution messages.

The minting block may also designate that a portion of the newly minted quantity of the cryptographically generated data is to be allocated to e.g. a mining node of the blockchain network (in a Proof or Work-based or a Proof of Authority-based consensus system). That is, the minting mechanism may be used to complement the consensus mechanism used to maintain the blockchain.

Verifying that a certifier has communicated a quality certification message may further comprise the quality certification message contains a proof of authority, the proof of authority indicating that the certifier that created the certification message has the authority to determine the quality parameter values.

At least one of the one or more contribution messages may indicate a contributor to which the biological dataset belongs.

A contribution message of the one or more contribution messages may further comprise a permission status, the permission status indicating whether the contributor to which the biological dataset belongs has permitted the biological dataset to be shared by the certifier to a third party. The minting block may further comprise a circulation status, the circulation status indicating when the new unit of cryptographically generated data will be withdrawn from circulation, the circulation status determined based at least in part on the permission status.

The biological dataset may comprise a genetic sequence. The biological dataset may comprise phenotype information.

The dataset identifier may comprise a hash of the biological dataset.

According to an aspect of the invention, a computer-readable medium is provided, the computer-readable medium having instructions stored thereon, which when executed by a processor, causes the processor to perform a method for appending a minting block to a blockchain as described herein.

According to an aspect of the invention, a computing apparatus is provided. The computing apparatus comprises one or more processors. The computing apparatus further comprises one or more machine readable storage media having instructions stored thereon which when processed by the one or more processors, cause the one or more processors to perform a method for appending a minting block to a blockchain as described herein. The computing apparatus may comprise or be a central mint. The computing apparatus may be a node of the blockchain network supporting the cryptographically generated data.

According to an aspect of the invention, a method is provided, the method for performance by a certifier. The certifier is a computing device trusted by nodes of a blockchain network supporting a cryptographically generated data through synchronization over peer-to-peer nodes. The method comprises receiving a biological dataset. The method further comprises receiving one or more identifiers of a corresponding one or more contributors, each contributor having contributed to the provision of a biological dataset. The method further comprises analysing the received biological dataset to determine one or more quality parameter values, the one or more quality parameter values indicating a quality of the biological dataset. The method further comprises transmitting, to each of the one or more contributors, a corresponding claim certificate for claiming at least a portion of a new unit of the cryptographically generated data. Each claim certificate is certified by the certifier and comprises at least (i) the identifier of the contributor, (ii) an anonymous credential of the contributor, and (iii) a dataset identifier for uniquely identifying the biological dataset. The method further comprises communicating a quality certification message. The quality certification message is for use in creating a minting block for establishing the new quantity of the cryptographically generated data.

Communicating the certification message may comprise causing a node of the blockchain network to append a block to the blockchain, the block comprising the certification message.

Communicating the certification message may comprise sending the certification message off-chain to a central mint.

The method may further comprise receiving evidence that the biological dataset belongs to a contributor.

The quality certification message may further comprise a permission status, the permission status indicating whether the contributor to which the biological dataset belongs has permitted the biological dataset to be shared by the certifier to a third party.

The biological dataset may comprise a genetic sequence and/or phenotype information.

The quality certification message may comprise the data set identifier, the one or more anonymous credentials of the corresponding one or more contributors, and the one or more quality parameter values.

According to an aspect of the invention, a computer-readable medium is provided, the computer-readable medium having instructions stored thereon, which when executed by a processor of a certifier, causes the processor to perform a method as described herein.

According to an aspect of the invention, a computer-readable medium is provided, the computer-readable medium having instructions stored thereon, which when executed by a processor of, for example, a certifier, causes the processor to receive a biological dataset, receive one or more identifiers of a corresponding one or more contributors, each contributor having contributed to the provision of a biological dataset, analyse the received biological dataset to determine one or more quality parameter values, the one or more quality parameter values indicating a quality of the biological dataset, transmit, to each of the one or more contributors, a corresponding claim certificate for claiming at least a portion of a new unit of the cryptographically generated data, each claim certificate certified by the certifier and comprising the identifier of the contributor, an anonymous credential of the contributor; and a dataset identifier for uniquely identifying the biological dataset; and communicate a quality certification message, wherein the quality certification message is for use in creating a minting block for establishing the new unit of the cryptographically generated data.

The instructions may further cause the processor to cause a node of the blockchain network to append a block to the blockchain, the block comprising the certification message.

The instructions may further cause the processor to send the certification message off-chain to a central mint.

The instructions may further cause the processor to receive evidence that the biological dataset belongs to a contributor.

The quality certification message may comprise a permission status, the permission status indicating whether the contributor to which the biological dataset belongs has permitted the biological dataset to be shared by the certifier to a third party.

The biological dataset may comprise a genetic sequence and/or phenotype information.

The quality certification message may comprise the dataset identifier, the one or more anonymous credentials of the corresponding one or more contributors; and the one or more quality parameter values.

According to an aspect of the invention, a certifier is provided. The certifier comprises one or more processors. The certifier further comprises one or more machine readable storage media having instructions stored thereon which when processed by the one or more processors, cause the one or more processors to perform a method as described herein.

According to an aspect of the invention, a computing apparatus operating as a certifier is provided. The certifier comprises one or more processors. The certifier further comprises one or more machine readable storage media having instructions stored thereon which when processed by the one or more processors, cause the one or more processors to receive a biological dataset, receive one or more identifiers of a corresponding one or more contributors, each contributor having contributed to the provision of a biological dataset, analyse the received biological dataset to determine one or more quality parameter values, the one or more quality parameter values indicating a quality of the biological dataset, transmit, to each of the one or more contributors, a corresponding claim certificate for claiming at least a portion of a new unit of the cryptographically generated data, each claim certificate certified by the certifier and comprising, the identifier of the contributor, an anonymous credential of the contributor; and a dataset identifier for uniquely identifying the biological dataset; and communicate a quality certification message, wherein the quality certification message is for use in creating a minting block for establishing the new unit of the cryptographically generated data, wherein the quality certification message comprises, the dataset identifier, the one or more anonymous credentials of the corresponding one or more contributors; and the one or more quality parameter values.

The one or more processors may be further operable to cause a node of the blockchain network to append a block to the blockchain, the block comprising the certification message.

The one or more processors may be further operable to send the certification message off-chain to a central mint.

The one or more processors may be further operable to receive evidence that the biological dataset belongs to a contributor.

The quality certification message may comprise a permission status, the permission status indicating whether the contributor to which the biological dataset belongs has permitted the biological dataset to be shared by the certifier to a third party.

The biological dataset may comprise a genetic sequence and/or phenotype information.

According to an aspect of the invention, a method for performance by one or more user devices, the cryptographically generated data supported by a blockchain through synchronization over peer-to-peer nodes is provided. The method comprises causing a biological dataset to be sent to a certifier, the certifier trusted by nodes of the blockchain network. The method further comprises causing a unique identifier of each of one or more contributors to be sent to the certifier, wherein each contributor is a user that contributed to the provision of the biological dataset. The method further comprises receiving, by each of the one or more contributors, a corresponding claim certificate, each claim certificate associating the identifier of the corresponding contributor with an anonymous credential of that contributor and a dataset identifier for uniquely identifying the biological dataset, each claim certificate signed by the certifier. The method further comprises causing one or more contribution messages to be communicated, each contribution message comprising at least (i) an anonymous credential of a contributor, and (ii) the dataset identifier.

The method may further comprise determining that at least a portion of a new quantity or unit of cryptographically generated data has been allocated to a contributor. The new unit of cryptographically generated data may be created partially in response to the communication of the one or more contribution messages.

The method may further comprise providing, by a contributor, a proof of possession of a claim certificate when spending a part of the at least a portion of the new unit of cryptographically generated data.

The method may further comprise causing one or more contribution messages to be communicated comprises causing one or more blocks to be appended to the blockchain, the one or more blocks comprising the one or more contribution messages.

The method may further comprise accessing the blockchain to verify that the one or more contribution messages have been communicated.

The method may further comprise causing one or more contribution messages to be communicated may comprise transmitting the one of more contribution messages to a central mint off-chain.

The biological dataset may comprise a genetic sequence and/or phenotype information. According to an aspect of the invention, a computer-readable medium is provided, the computer-readable medium having instructions stored thereon, which when executed by a processor of a device associated with a participant in the cryptographically generated data, causes the processor to perform the method a method as described herein.

According to an aspect of the invention, a computer-readable medium having instructions stored thereon is provided, which when executed by a processor, causes the processor to cause a biological dataset to be sent to a certifier, the certifier trusted by nodes of the blockchain network, cause a unique identifier of each of one or more contributors to be sent to the certifier, wherein each contributor is a user that contributed to the provision of the biological dataset, receive, by each of the one or more contributors, a corresponding claim certificate, each claim certificate associating the identifier of the corresponding contributor with an anonymous credential of that contributor and a dataset identifier for uniquely identifying the biological dataset, each claim certificate signed by the certifier; and cause one or more contribution messages to be communicated, each contribution message comprising an anonymous credential of a contributor; and the dataset identifier.

The instructions may further cause the processor to determine that at least a portion of a new unit of cryptographically generated data has been allocated to a contributor, the new unit of cryptographically generated data created partially in response to the communication of the one or more contribution messages.

The instructions may further cause the processor to provide, by a contributor, a proof of possession of a claim certificate when spending a part of the at least a portion of the new unit of cryptographically generated data.

The instructions may further cause the processor to append one or more blocks to the blockchain, the one or more blocks comprising the one or more contribution messages.

The instructions may further cause the processor to access the blockchain to verify that the one or more contribution messages have been communicated.

The instructions may further cause the processor to transmit the one of more contribution messages to a central mint off-chain.

The biological dataset may comprise a genetic sequence and/or phenotype information.

According to an aspect of the invention, a user device is provided. The user device comprising one or more processors, and one or more machine readable storage media having instructions stored thereon which when processed by the one or more processors, cause the one or more processors to cause a biological dataset to be sent to a certifier, the certifier trusted by nodes of the blockchain network, cause a unique identifier of each of one or more contributors to be sent to the certifier, wherein each contributor is a user that contributed to the provision of the biological dataset, receive, by each of the one or more contributors, a corresponding claim certificate, each claim certificate associating the identifier of the corresponding contributor with an anonymous credential of that contributor and a dataset identifier for uniquely identifying the biological dataset, each claim certificate signed by the certifier, and cause one or more contribution messages to be communicated, each contribution message comprising an anonymous credential of a contributor and the dataset identifier.

The one or more processors may be further operable to determine that at least a portion of a new unit of cryptographically generated data has been allocated to a contributor, the new unit of cryptographically generated data created partially in response to the communication of the one or more contribution messages.

The one or more processors may be further operable to provide, by a contributor, a proof of possession of a claim certificate when spending a part of the at least a portion of the new unit of cryptographically generated data.

The one or more processors may be further operable to transmit the one of more contribution messages to a central mint off-chain.

The one or more processors may be further operable to append one or more blocks to the blockchain, the one or more blocks comprising the one or more contribution messages.

The biological dataset may comprise a genetic sequence and/or phenotype information.

According to an aspect of the invention, a system is provided for appending a minting block to a blockchain supporting a cryptographically generated data through synchronization over peer-to-peer nodes. The system comprises a network comprising one or more user devices associated with contributors to the provision of a biological dataset, a mint, and one or more certifiers, each certifier trusted by nodes of a blockchain network maintaining the blockchain and trusted by the mint. A contributor is configured to cause the biological dataset to be sent to a certifier. The contributor is further configured to cause an identifier of the contributor to be sent to the certifier. The contributor is further configured to receive a corresponding claim certificate, the claim certificate associating the identifier of the contributor with an anonymous credential of the contributor and a dataset identifier uniquely identifying the biological dataset, the claim certificate signed by the certifier. The contributor is further configured to cause a contribution message to be communicated to the mint, the contribution message comprising at least (i) the anonymous credential of the contributor, and (ii) the dataset identifier. The certifier is configured to receive the biological dataset and one or more identifiers of the one or more contributors. The certifier is further configured to analyse the biological dataset to determine one or more quality parameter values, the one or more quality parameter values indicating a quality of the biological dataset. The certifier is further configured to transmit, to each of the user devices of the one or more contributors, the corresponding claim certificate. The certifier is further configured to communicate a quality certification message to the mint, the quality certification message comprising at least (i) the dataset identifier, (ii) the one or more anonymous credentials of the corresponding one or more contributors, and (iii) the one or more quality parameter values. The mint is configured to create a minting block for establishing a new quantity of the cryptographically generated data, the minting block comprising at least (i) the dataset identifier, (ii) the one or more anonymous credentials determined from the quality certification message, (iii) the one or more quality parameter values, (iv) a carat status indicating a value of the new quantity of cryptographically generated data, the carat status determined at least in part from the one or more quality parameter values, and (v) cryptographically generated data allocation information, the cryptographically generated data allocation information indicating users to which at least a portion of the new quantity of cryptographically generated data is allocated, the indicated users comprising the one or more contributors. The mint is further configured to cause the minting block to be appended to the blockchain.

The mint may be a node of the blockchain network. The mint may be a central mint. The network may include at least some of the nodes of the blockchain network. The mint may be a node of the blockchain network or wherein the mint is a central mint. The network may include the nodes of the blockchain network. The biological dataset may comprise a genetic sequence, and optionally wherein the biological dataset comprises phenotype information.

Many modifications and other embodiments of the inventions set out herein will come to mind to a person skilled in the art to which these inventions pertain in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the invention.

BRIEF DESCRIPTION OF THE DRAWINGS

Embodiments of the invention will now be described, by way of example only, with reference to the accompanying drawings in which like reference numerals are used to depict like parts. In the drawings.

DETAILED DESCRIPTION

Figure 1:
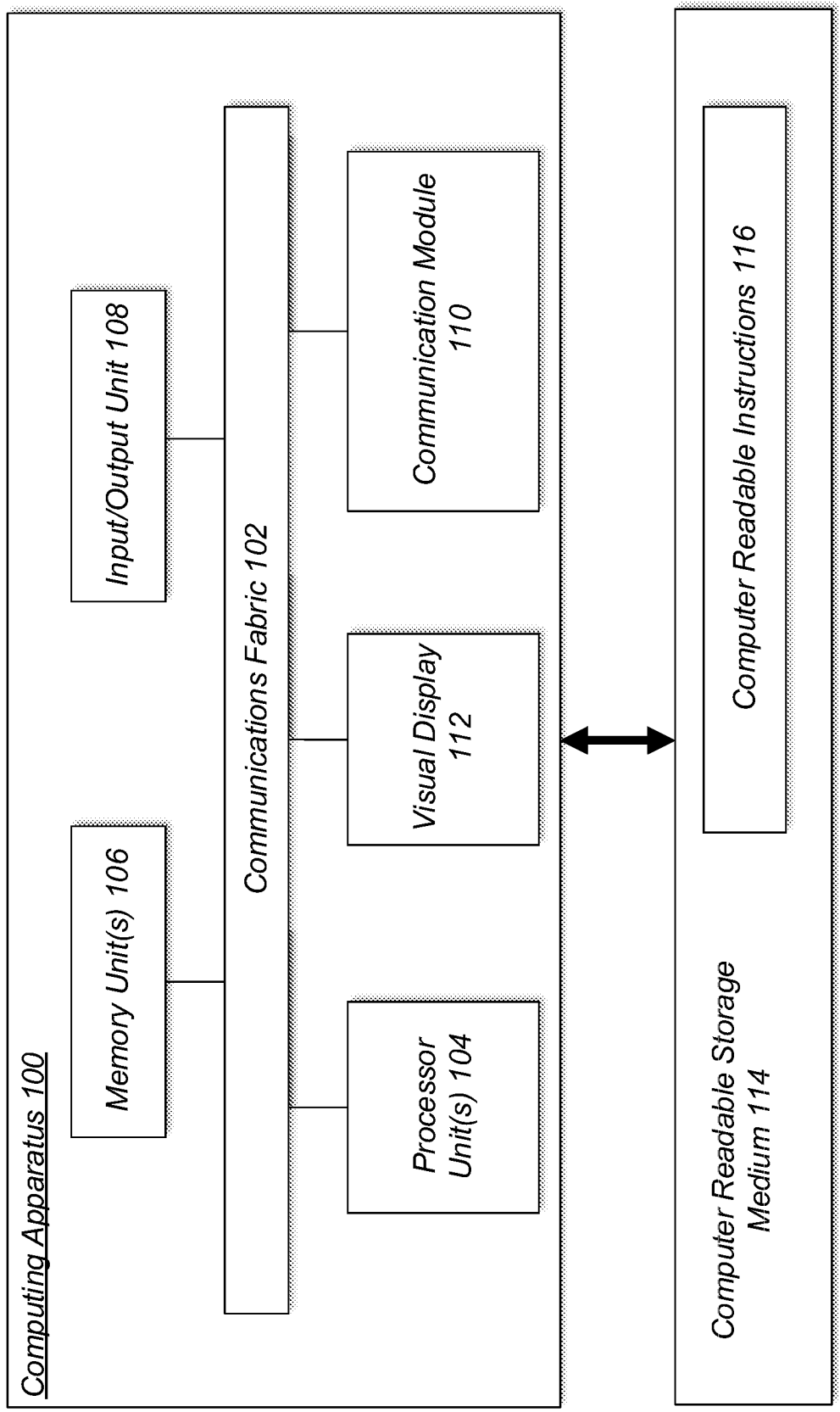
FIG. 1 shows a block diagram of a computing device and a computer-readable storage medium.

Whilst various embodiments are described below, the invention is not limited to these embodiments, and variations of these embodiments may well fall within the scope of the invention which is to be limited only by the claims.

As will be appreciated by one skilled in the art, the present invention may be embodied as a system, method, or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program embodied in any one or more computer-readable medium/media having computer usable program code embodied thereon.

Aspects and embodiments of the present invention are described below with reference to flowchart illustrations and/or block diagrams of methods, apparatus (systems) and computer programs according to illustrative examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computing device, other programmable data processing apparatus, or other devices to function in a particular manner, such that the instructions stored in the computer-readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer programs according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the illustrations. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative examples described herein may be utilized in many different types of data processing environments including a distributed data processing environment, a single data processing device, or the like.

With reference now to the illustrations, FIG. 1 depicts a block diagram of a data processing system/computing device/computing apparatus 100 in which illustrative embodiments may be implemented. Computing device 100 is an example of a computer, in which computer usable program code or instructions implementing the processes may be located. In this example, data processing system 100 includes communications fabric 102, which provides communications between processor unit(s) 104, memory unit(s) 106, input/output unit 108, communications module 110, and display 112.

The one or more processing units/processors 104 are configured to execute instructions for software that may be loaded into the memory 106. Processor unit(s) 104 may be a set of one or more processors or may be a multi-processor core, depending on the particular implementation. Furthermore, processor unit(s) 104 may be implemented using one or more heterogeneous processor systems in which a main processor is present with secondary processors on a single chip.

The one or more memory unit(s) 106 may comprise any piece of hardware that is capable of storing information, such as, for example, data, program code in functional form, and/or other suitable information on a temporary basis and/or a permanent basis. The one or more memory units 106 may include, for example, a random access memory or any other suitable volatile or non-volatile storage device. The one or more memory units may include a form of persistent storage, for example a hard drive, a flash memory, a rewritable optical disk, a rewritable magnetic tape, or some combination thereof. The media used for persistent storage may also be removable. For example, the one or more memory units 106 may include a removable hard drive.

Input/Output unit 108 enables the input and output of data with other devices that may be in communication with the computing device 100. For example, input/output unit 108 may provide a connection for user input through a keyboard, a mouse, and/or other suitable devices. The input/output unit 108 may provide outputs to, for example, a printer.

Communications module 110 enables communications with other data processing systems or devices. The communications module 110 may provide communications through the use of either or both physical and wireless communications links.

Instructions for the applications and/or programs may be located in the one or more memory units 106, which are in communication with processor unit 104 through communications fabric 102. Computer-implementable instructions may be in a functional form on persistent storage in the memory unit(s) 106, and may be performed by processor unit 104.

These instructions may sometimes be referred to as program code, computer usable program code, or computer-readable program code that may be read and executed by a processor in processor unit 104. The program code in the different embodiments may be embodied on different physical or tangible computer-readable media.

In FIG. 1, computer-readable instructions are located in a functional form on computer-readable storage medium 114 that is selectively removable and may be loaded onto or transferred to computing device 100 for execution by processor unit(s) 104. A computer-readable storage medium may be, for example, but not limited to, an electronic, magnetic, optical, electromagnetic, infrared, or semiconductor system, apparatus, device, or any suitable combination thereof. More specific examples of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, a magnetic storage device, or any suitable combination thereof. In the context of this document, a computer-readable storage medium may be any tangible medium that can contain or store a program for use by or in connection with an instruction execution system, apparatus, or device.

Alternatively, computer-readable instructions 116 may be transferred to computing device 100 from computer-readable storage medium 114 through a communications link to communications module 110 and/or through a connection to input/output unit 108. The communications link and/or the connection may be physical or wireless.

In some illustrative embodiments, computer-implementable instructions 116 may be downloaded over a network to the memory unit(s) 106 from a remote device for use with computing device 100. For instance, computer-implementable instructions stored in a remote server may be downloaded over a network from the server to the device 100.

The skilled person would appreciate that the architecture described above in relation to FIG. 1 is not intended to provide limitations on the computing devices with which the methods described herein may be implemented. Instead, the skilled person would appreciate that other architectures may be applied. For example, the computing device may include more or fewer components.

Figure 2:
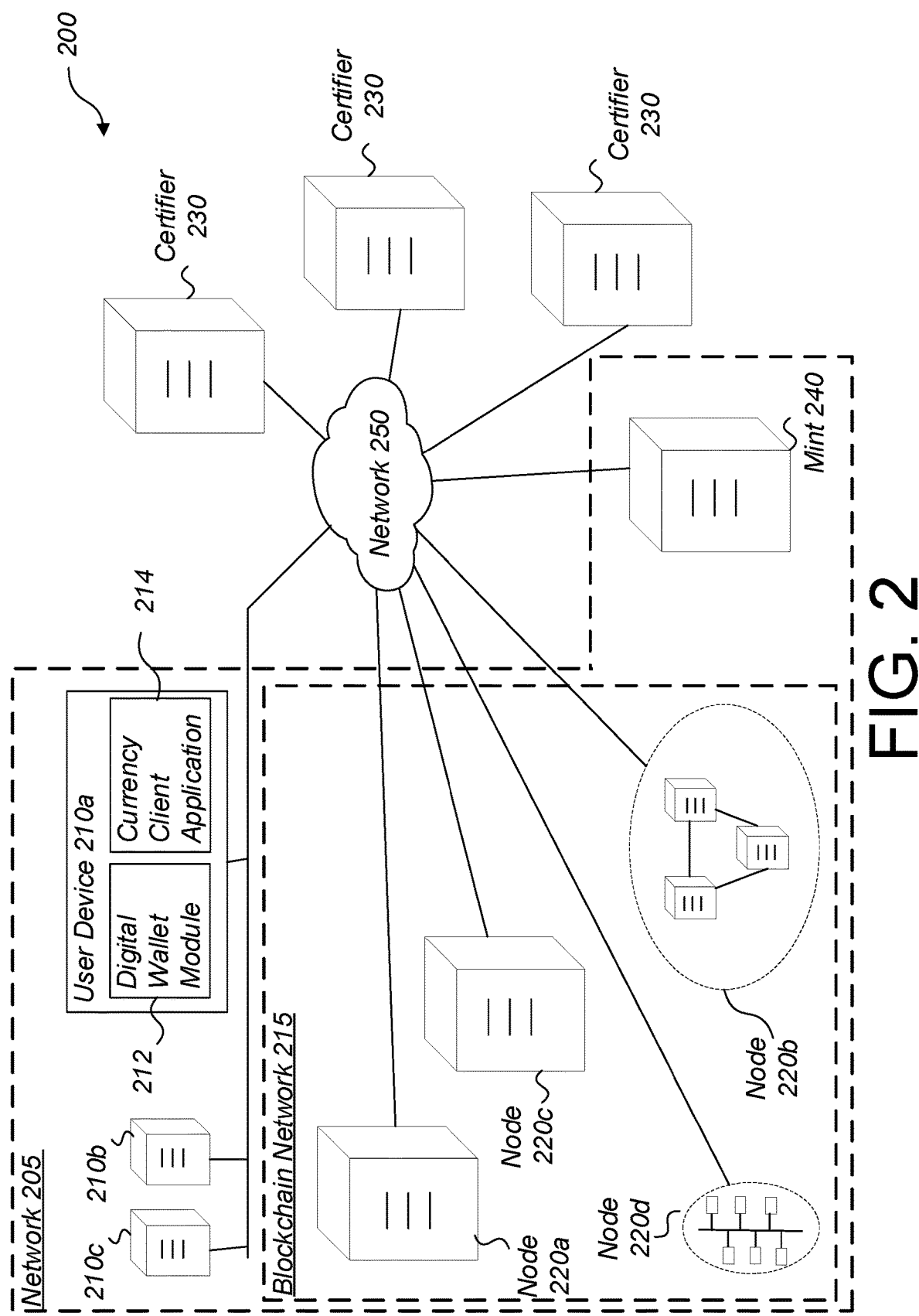
FIG. 2 shows a communications system for supporting cryptographically generated data.

FIG. 2 depicts a communication system 200 that includes a communication network 250, several certifiers 230, a mint 240 and a network 205.

Within the network 205 is a blockchain network 215 comprising several blockchain nodes 220 (shown in FIG. 2 as nodes 220*a*-220*d*, although the skilled person would appreciate that a blockchain network would typically comprise a greater number of nodes).

The blockchain nodes 220 may take any suitable form and may comprise any suitable computing apparatus. For example a node may comprise a computing apparatus 100 such as that described in FIG. 1. In FIG. 2, nodes 220*a* and 220*c* are shown as computers or servers and may be any suitable computing devices capable of storage and data processing, such as a personal computer, a server, a laptop computer, or other such machine. Node 220*b* is shown as a mining pool or collection or cluster of interconnected computing devices, such as a collection of servers or personal computers, which are configured to collectively process blockchain information by, for example, parallel processing of data or by dividing up tasks amongst themselves. The collection of computing devices may communicate with one another via direct, peer-to-peer connection, or via some other network (such as the Internet or a closed local network such as an Intranet). The collection of computing devices may collectively communicate with other computing devices over the communication network 250. Node 220*d* is shown as a collection of dedicated processors and storage devices.

The skilled person would appreciate that a node 220 is any suitable computing apparatus. For example, a node 220 may comprise one or more computing devices such as laptop computers, desktop computers, workstations, blade servers, mainframes and so on.

The blockchain nodes 220 together form the infrastructure of a blockchain. All nodes 220 of the blockchain network 215 exchange information about the blockchain with one or more other nodes so that each node can store up-to-date blockchain data. A blockchain node 220 is accordingly understood to mean an entity that is configured to store, spread and preserve the blockchain data. For example, nodes 220 may be configured to check if a block of a blockchain is valid and accept or reject the block accordingly. For example, nodes 220 may be configured to save and store blocks (and therefore the blockchain history). For example, nodes 220 may be configured to communicate this blockchain history to other nodes 220 that may need to synchronise with the blockchain. One or more nodes 220 may be so-called "full nodes". A full node is a device that contains a full copy of the history of the blockchain.

Each node 220 is configured to communicate with at least one other node 220 and optionally other devices over the communication network 210 to form a peer-to-peer blockchain network 215 of devices that take part in the sharing, storing and/or establishment of a blockchain. Although the blockchain network 215 of FIG. 2 is shown as comprising only the nodes 220, the blockchain network 215 may further comprise one or more certifiers 230 if a certifier is also configured to function as a node. Furthermore, the blockchain network may further comprise the mint 240 if the mint is configured to function as a node.

The blockchain supports a cryptographically generated data. That is, at least some blocks of the blockchain contain transaction information concerning the transfer of quantities of the cryptographically generated data from one digital folder to another. The transaction history is preserved by virtue of the integrity of the blockchain being stored on multiple nodes 220 of the blockchain network 215.

The network 205 comprises several user devices 210 associated with users/participants in the cryptographically generated data (shown in FIG. 2 as user devices 210a-210c, although the skilled person would appreciate that a network would typically comprise a greater number of participants). User device 210a is one example of a user device 210. The user device 210a may be any suitable computing device, such as device 100 of FIG. 1. The user device 210a is configured to run a digital folder module 212 and a client application 214. In the context of cryptographically generated data, a digital folder module 212 typically provides functionality for storing the credentials of a user associated with the user device. In particular, digital folder module 212 can generate and store the user's public key (public address) and can securely store a user's private key. The digital folder module 212 typically also includes functionality enabling the digital wallet to interact with processes and services to enable transactions to be made. The client application 214, in conjunction with the digital folder module 212, enables a user of the user device 210a to conduct cryptographically generated data transactions with other participants (e.g. 210b, 210c) in the network 205.

The blockchain provided by the blockchain network 215 may thus be used as a record-keeping system that maintains participants' identities in secure and (pseudo-)anonymous form, their respective cryptographically generated data balances, and a record book of all the genuine transactions executed between network participants.

The blockchain network 215 is shown as a subset of the network 205 in FIG. 2. However, the skilled person would appreciate that this may or may not be the case. Nodes 220 that store, communicate and preserve the blockchain (and therefore the cryptographically generated data) may or may not also be user devices, in that they may be configured to conduct transactions with units of the cryptographically generated data. In some examples, the network 205 may comprise the entire blockchain network 215. In some examples, the network 205 may partially overlap the blockchain network 215 (in that some nodes 220 may also operate as user devices while other nodes do not). In some examples, the network 205 may be separate to the blockchain network 215—that is, the nodes 220 may maintain the blockchain and therefore the transaction history of the cryptographically generated data, while the user devices 210 do not maintain the blockchain but their associated users may be referenced in the transaction history stored therein.

The network further comprises a mint 240 which will be described further below.

At least some of the user devices 210 of the network 205 may be further configured to communicate with one or more certifiers 230 over a communication network 250. As will be described further below, user devices may interact with a certifier 230 in order to provide a biological dataset to the certifier 230, and subsequently the users of those devices can be allocated at least a portion of a newly minted unit of a cryptographically generated data. Participants/users that contribute to providing a biological dataset to a certifier may be referred to as "contributors".

While FIG. 2 shows the certifier 230 communicatively coupled with the same communication network 250 as the network 205, this need not be the case. Furthermore, although only three certifiers 230 are shown in FIG. 2, there may be more or fewer certifiers 230. In some examples, a certifier 230 may also be configured to operate as a blockchain node 220, and would therefore be a part of the blockchain network 215. In some examples, a certifier 230 may also be configured to be a participant device in the network 205.

A certifier 230 may comprise any suitable computing apparatus, such as the computing apparatus 100 shown in FIG. 1. A certifier 230 is a computing device trustable by several nodes 220 of the blockchain network, such that a digital signature or other form of verifiable transaction authorization (such as a certificate) issued by the certifier 230 can enable a node 220 to determine that an operation, or some sort of data signed by the certifier 230, has been marked as valid and is therefore trustable by the node 220. That is, each certifier is able to provide some Proof of Authority. Each certifier 230 is configured to communicate with one or more of the nodes 220 over a communication network 210, and in the example of FIG. 2 to communicate with the mint 240 also. A certifier 230 may be operated by, for example, a trusted research institute or public body.

A certifier 230 is configured to analyse a received biological dataset and to provide an indication as to the quality of that biological dataset. A certifier 230 is able to communicate a quality certification message to the mint 240, which is analysed by the mint 240 in the process of creating a new unit of the cryptographically generated data. A certifier 230 is also able to communicate claim certificates to contributors that can be used by those contributors to spend any portions of the new unit of the cryptographically generated data that are allocated to those contributors.

The network also comprises a mint 240.

In some examples, the mint 240 may be a node 220 of the blockchain network 215, which may be particularly useful for a decentralised cryptographically generated data. The functionality of the mint may be built into the computer-executable instructions that are executed by all nodes in maintaining the blockchain. In such circumstances, the identity of the mint may be updated or changed over time. For example, a first node may act as a node for creating a first new minting block of the cryptographically generated data, while minting responsibilities may be assigned to a second node for creating a second new minting block of the cryptographically generated data. The assignment of a node as mint may be provided according to any consensus mechanism, such as Proof of Stake.

In other examples, the mint 240 may be a central mint in a centralised cryptographically generated data. For example, the central mint may be trusted by nodes 220 of the blockchain network 215 and the certifiers 230 may act as agents of the central mint. The central mint may track and validate the certifiers 230 such that the certifiers 230 are trustable by the blockchain nodes 220. For example, the central mint 240 may sign certificates to each certifier 230 which can be used by the certifiers to build a trust relationship with nodes of the blockchain network 215.

Whether the system 200 is centralised or not, the mint 240 is configured to create a new block for appending to the blockchain, the new blockchain defining a new unit of the cryptographically generated data. The value of that new unit depends on the quality parameters indicated in a quality certification message communicated by a certifier. At least a portion of the new unit of the cryptographically generated data is allocated to a contributor to the provision of the biological dataset. The functionality of the mint will be described in more detail further below.

Figure 3:
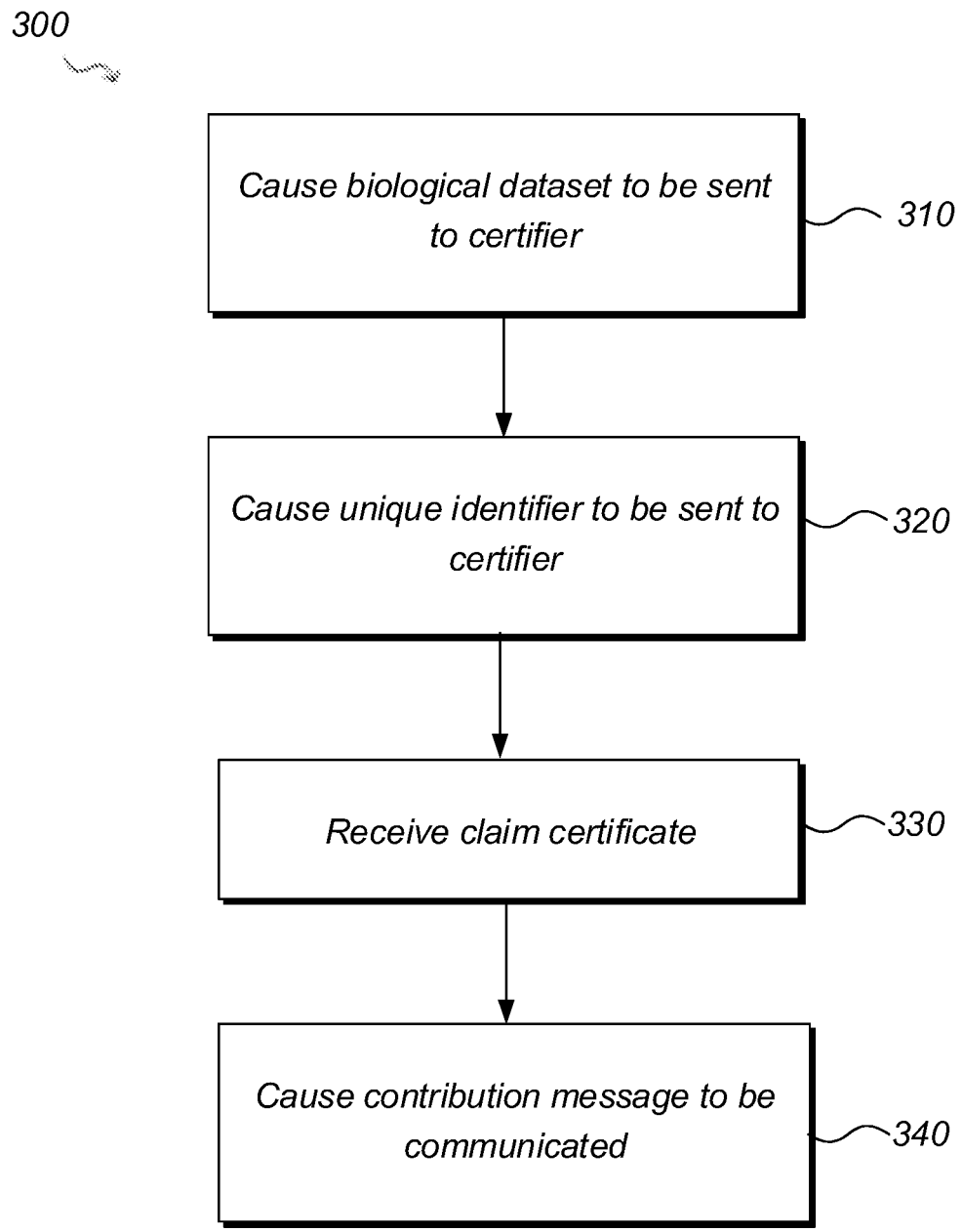
FIG. 3 shows a flowchart.

FIG. 3 shows a flowchart of a method 300 for performance by one or more user devices 210 that contribute to the provision of a biological dataset, i.e. a "contributor". A user device may be any suitable computing apparatus such as computing apparatus 100.

At 310, the method comprises causing a biological dataset to be sent to a certifier 230, the certifier trusted by nodes 220 of a blockchain network 215. Causing a biological dataset to be sent to a certifier 230 may comprise sending the biological dataset directly to the certifier 230 over a private channel, or may comprise sending the biological dataset via an intermediary. The biological dataset is not communicated on the blockchain and is preferably communicated over a private and secure channel.

The biological dataset may be any suitable biological dataset. For example, the biological dataset may comprise a polynucleotide sequence and phenotype information. A polynucleotide sequence may be DNA or RNA represented by raw or processed sequence outputs. Phenotype information can be any data that is qualitative or quantitative, discrete or continuous, subjective (self-reported) or objective (measurable by standardised methods).

At 320, the method comprises causing a unique identifier of each of one or more contributors to be sent to the certifier. Each contributor is a participant of the cryptographically generated data that contributed to the provision of the dataset. Causing a unique identifier to be sent to a certifier 230 may comprise sending the unique identifier directly to the certifier 230 over a private channel, or may comprise sending the unique identifier via an intermediary.

A unique identifier may comprise, for example, a unique name or number for identifying a contributor, a public key of the contributor, and so on.

Operations 310 and 320 may be performed in any order or at substantially the same time.

While not shown in FIG. 3, the method may further comprise causing further information to be sent to the certifier 230. For example, a contributor purporting to be the legal owner of the biological dataset or the biological material from which that biological dataset was derived may be required to provide some evidence of their legal ownership of the biological dataset/biological material.

At 330, the method comprises receiving, by each of the one or more contributors, a corresponding claim certificate. Each claim certificate associates the unique identifier of the corresponding contributor with an anonymous credential of that contributor. Each claim certificate further associates the unique identifier of the corresponding contributor with a dataset identifier for uniquely identifying the biological dataset. Each claim certificate is signed by the certifier 230 and so can be trusted by a node of the blockchain network 215.

An anonymous credential is to be understood broadly as some information that can be used by the contributor to which the claim certificate was issued to verify their identity without needing to reveal their identity. An anonymous credential can also be referred to as a zero knowledge identifier, and the anonymous credential may be generated by a zero knowledge protocol A dataset identifier may be any identifier that can be used to uniquely identify the corresponding biological dataset. For example, the certifier may have stored the biological dataset in a database (inaccessible to the network) and the dataset identifier may comprise a hash of the biological dataset and any other relevant information stored in the database entry. The dataset identifier may comprise an indication of which entry in the database corresponds to the biological dataset.

The claim certificates enable the contributors to claim some or all of a newly minted unit of cryptographically generated data. More particularly, once a new minting block has been created and appended to the blockchain, the contributors can spend the cryptographically generated data allocated to them in that minting block by proving possession of their claim certificate. Proving possession of their claim certificate may comprise presenting or providing their certificate or using any other privacy-preserving method for presenting their certificate, for example a zero knowledge proof. In one example, the contributors may fully present their claim certificate and in another example, they may only present a part of their claim certificate. In one example, the claim certificate is only partially presented such that confidential or private information remains hidden.

At 340, the method comprises causing one or more contribution messages to be communicated.

In some examples, causing a contribution message to be communicated may comprise causing the contribution message to be appended to the blockchain. For example, the contribution message may be passed to a data pool, from which a node 220 of the blockchain network may take the contribution message and incorporate it into a block that is then validly added to their local copy of the blockchain and communicated to other nodes of the blockchain network 215. In this way, a contribution message may be communicated to all viewers of the blockchain including a mint, whether that mint is a part of a decentralised blockchain network or whether that mint is a central mint.

In some examples, in which the mint is separate from the blockchain network 215 for example when the mint is a central mint, causing a contribution message to be communicated may comprise communicating the contribution message directly or indirectly to the mint off-chain. The contribution message may in some examples be communicated over a private channel.

A contribution message enables a contributor to indicate to a mint that they have contributed to the provision of a particular biological dataset and should accordingly be allocated at least a share of a newly minted unit of the cryptographically generated data.

Each contribution message comprises an anonymous credential of a contributor. The contribution message may further comprise further anonymous credentials of further contributors. For example, a first contributor may communicate a contribution message that comprises the anonymous credential of the first contributor, and optionally also the anonymous credential of a second contributor, and further optionally anonymous credentials of further contributors. For example, a first contributor may be the legal owner of the biological material from which a biological dataset is derived, and a second contributor may be the entity that derives the biological dataset from the biological material. The first contributor may communicate a contribution message comprising the identifiers of both the first and second contributors. Similarly, the second contributor may communicate a contribution message comprising the identifiers of both the first and second contributors.

Each contribution message comprises the dataset identifier uniquely identifying the biological dataset. Accordingly, each contributor is linked to a particular dataset.

The contribution messages are used to announce that one or more users have contributed to the provision of the biological dataset. The contribution messages are subsequently considered by a mint 240 and, if a determination can be made that the contributor did contribute to the biological dataset identified by the database identifier, then the contributors receive at least a share of the newly minted unit of the cryptographically generated data. Accordingly, while not shown in FIG. 3, the method may further comprise receiving, by a contributor, at least a portion of a new unit of cryptographically generated data, the new unit of cryptographically generated data created partially in response to the communication of the one or more contribution messages. Receiving at least a portion of the new unit of the cryptographically generated data is understood broadly to mean that the portion is allocated to a digital wallet of the user.

In order to conduct a first transaction using at least a part of the portion of the newly minted cryptographically generated data, the contributor is required to prove possession of a claim certificate showing that the contributor is associated with that portion of the newly minted unit of the cryptographically generated data. After this first spend, the cryptographically generated data can be freely traded by users. Similarly to above, proving possession of a claim certificate may comprise presenting or providing their certificate or using any other privacy-preserving method for presenting their certificate, for example a zero knowledge proof. In one example, the contributors may fully present their claim certificate and in another example, they may only present a part of their claim certificate. In one example, the claim certificate is only partially presented such that confidential or private information remains hidden.

A contribution message may also be used to publish a permission status indicating whether the contributor to which the dataset belongs has permitted the biological dataset to be shared by the certifier with a third party. The contributor to which the dataset belongs accordingly maintains control over the dataset itself. However, the permission status may lead to tokens of the cryptographically generated data that are minted having a lesser value, or a limited lifetime for use.

Figure 4:
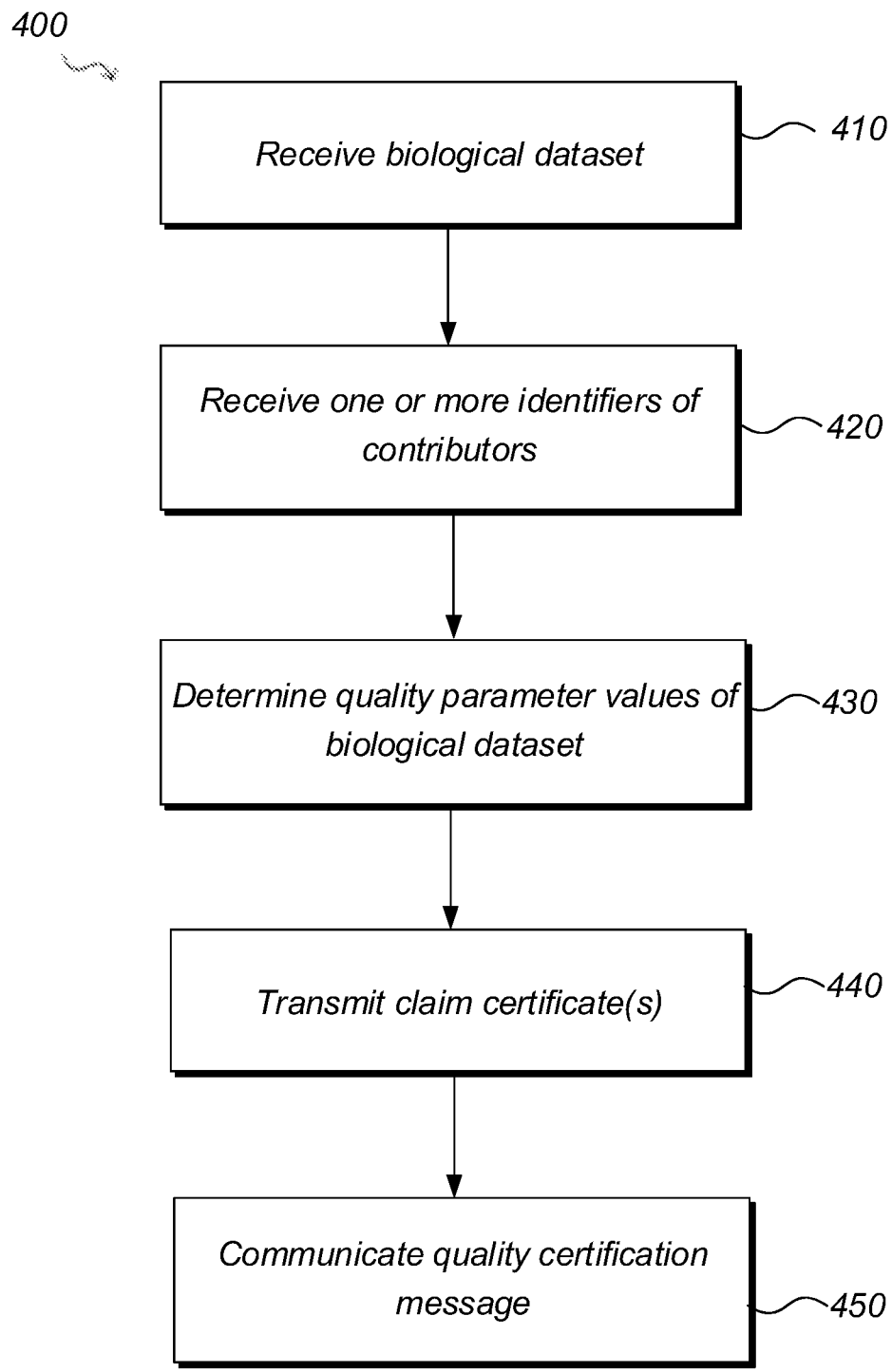
FIG. 4 shows a flowchart.

FIG. 4 shows a flowchart of a method 400 for performance by a computing apparatus such as computing apparatus 100. The method is suitable for performance by a certifier 230.

At 410, the method comprises receiving a biological dataset. The biological dataset is received off-chain. At 420, the method comprises receiving one or more identifiers of a corresponding one or more contributors, each contributor having contributed to the provision of the biological dataset. The steps at 410 and 420 may be performed in any order or at substantially the same time.

At 430, the method comprises analysing the received biological dataset to determine one or more quality parameter values, the one or more quality parameter values indicating a quality of the biological dataset.

The biological dataset may comprise any suitable biological dataset and the one or more quality parameters that are assessed may be any suitable quantifiable bioinformatic parameters.

The quality of the biological dataset is to be used to decide the value (i.e. the number of cryptotokens) that are created as part of the newly minted unit of the cryptographically generated data. Accordingly, a biological dataset needs to be analysed against a defined standard unit of measure for a biological dataset.

In examples, a biological dataset may comprise a polynucleotide sequence, and optionally phenotype data.

In some examples, a biological dataset may comprise genetic data. Examples of standard units of measure may include (i) Individual genomes or pangenomes, (ii) Individual transcriptomes or pantranscriptomes, (iii) For individuals, total genomes or transcriptomes: sets of genetic variants for pangenomes or pantrascriptomes.

Quality parameters against which the genetic data is assessed may include one or more of: sequencing representation type (full genome sequencing, or representations for sets of genetic variants), number of time points for the sequencing, times coverage (for example, 100×coverage of one genome size), accuracy of the sequencing reads included in the genome assembly (for example, a threshold of 99%), secondary modifications (methylations, acetylations, etc.), and number of pre-defined genetic variants included in the set if the sequencing type would be a set of genetic variants against a defined standard genome. A person of ordinary skill in the art would appreciate that this is a non-exhaustive list.

In this way, a certifier 230 may determine one or more quality parameter values indicating a quality of the received biological dataset.

At 440, the method comprises transmitting, to each of the one or more contributors, a corresponding claim certificate for claiming at least a portion of a new unit of the cryptographically generated data. Each claim certificate is signed by the certifier 230. As explained above, the claim certificates indicate to the contributors an anonymous credential, and the contributors use the claims certificates when first spending their share of the newly allocated unit of the cryptographically generated data.

At 450, the method comprises communicating a quality certification message. The quality certification message acts to indicate to the mint 240 which users contributed to the provision of a biological dataset, so that the mint can compare with contribution messages and correctly allocate shares of the newly minted cryptographically generated data to contributors. The quality certification message further acts to indicate to the mint 240 the quality of the received dataset. The mint 240 is then able to create a new minting block for establishing a new unit of the cryptographically generated data, the carat value of which is based on the quality of the biological dataset.

The quality certification message comprises the dataset identifier uniquely identifying the biological dataset. The quality certification message further comprises the one or more anonymous credentials of the corresponding on or more contributors. The quality certification message further comprises the one or more quality parameter values.

The quality certification message may further comprise a permission status of the contributor to which the dataset belongs.

Figure 5:
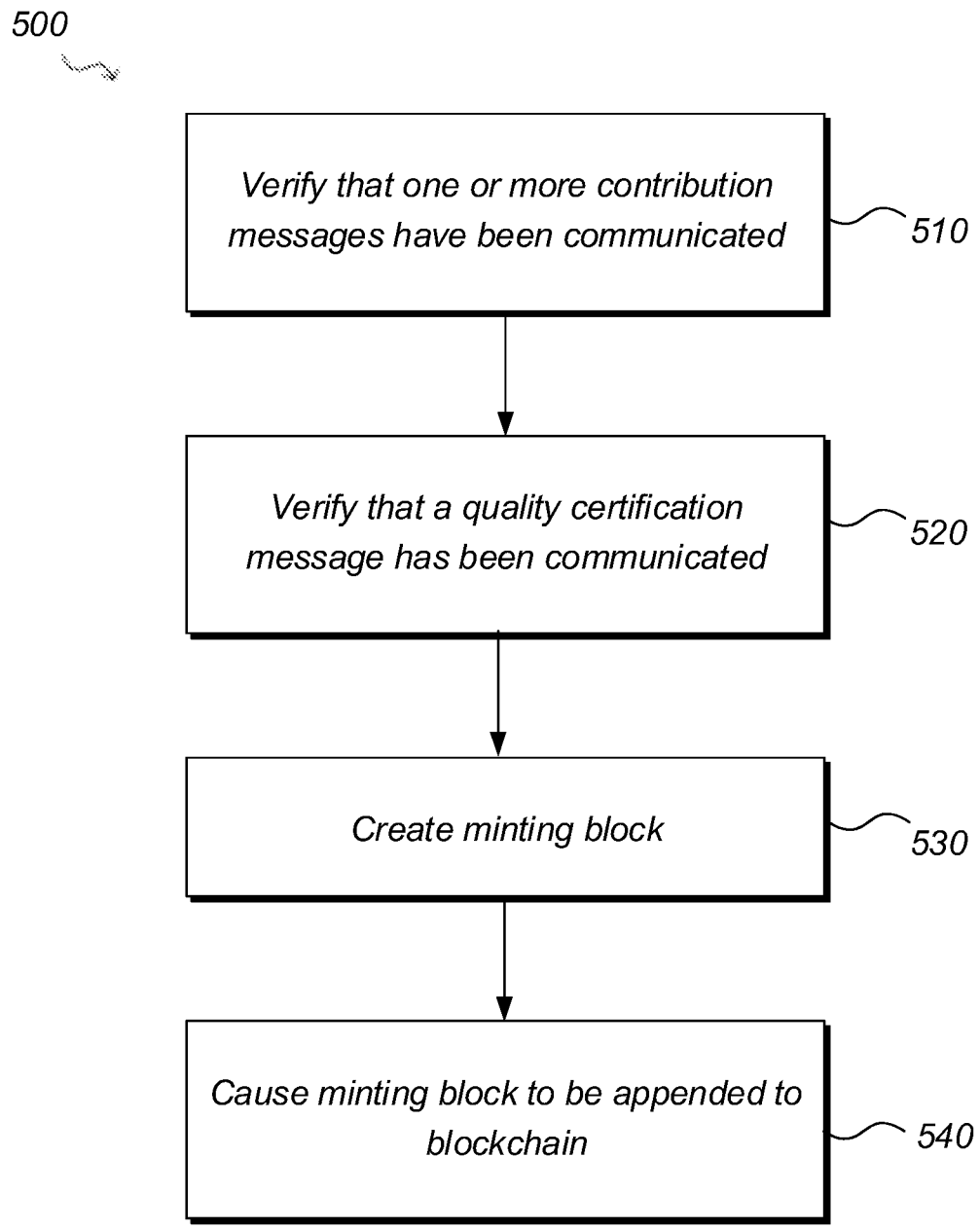
FIG. 5 shows a flowchart.

FIG. 5 shows a flowchart for performance by a computing apparatus such as computing apparatus 100. The method is suitable for performance by any entity acting as a mint 240, whether that entity is a central mint in a centralised system or a node 220 of a blockchain network 215.

At 510, the method comprises verifying that one or more contribution messages have been communicated, the one or more contribution messages for indicating that one or more participants in the cryptographically generated data have contributed to the provision of a biological dataset.

In some examples, verifying that the one or more contribution messages have been communicated may comprise accessing the blockchain to verify that the one or more contribution messages associated with the dataset identifier of the biological dataset have been included in a block or blocks of the blockchain.

In other examples, verifying that the one or more contribution messages have been communicated may comprise receiving the one or more contribution messages off chain. For example, a central mint may receive the contribution messages from the contributors themselves.

At 520, the method comprises verifying that a certifier 230 has communicated a quality certification message, the quality certification message signed by the certifier 230.

In some examples, verifying that a quality certification message has been communicated may comprise accessing the blockchain to verify that the quality certification message associated with the dataset identifier of the biological dataset has been included in a block of the blockchain. In other examples, verifying that a quality certification message has been communicated may comprise receiving the quality certification message from the certifier.

The certifier signature on the quality certification message is used to confirm that the quality certification message is genuine.

The mint 240 may conduct further checks before determining whether to create a new minting block for establishing a new unit of the cryptographically generated data. For example, the mint 240 may check that the quality certification message was communicated after the one or more contribution messages were communicated.

At 530, the method comprises creating a new minting block for establishing a new unit of the cryptographically generated data.

The minting block, once appended to the blockchain, is for introducing the new unit for the cryptographically generated data to the network. The minting block comprises the dataset identifier.

The minting block comprises the one or more anonymous credentials determined from the quality certification message. The minting block further comprises the one or more quality parameters.

The minting block further comprises a carat status indicating a value of the new unit of cryptographically generated data. The carat status is determined at least in part from the one or more quality parameter values.

In some examples, the carat value may be similar to the gold standard. For example, 24 ct gold represents 100% of the metal's value; similarly, if the quality parameter values of the biological dataset are above one or more threshold values, then the corresponding carat value may also represent 100% of the biological dataset's value. That is, one minting block may be appended to the blockchain, but the cryptotoken(s) generated by that minting block may have an associated level of "purity" based on the quality parameter values of the biological dataset.

In some examples, the value of the newly generated cryptographically generated data may be represented as a number of cryptotokens generated by the new mining block. The number of cryptotokens may be an integer value, or cryptotokens may be divisible into a number of subunits and the number of cryptotokens may be representable ad a decimal value.

The minting block further comprises cryptographically generated data allocation information. The cryptographically generated data allocation information indicates to which user(s) the newly minted quantity of cryptographically generated data is allocated. The cryptographically generated data allocation information indicates participants in the cryptographically generated data to which at least a portion of the new cryptographically generated data is allocated and the portion allotted to them. The indicated participants include at least the contributors but may include other users also.

Example contributors to which a portion of a newly minted quantity of cryptographically generated data can be allocated include: a user providing the biological material from which the biological dataset is derived; the user that generates the biological dataset from the biological material.

A portion of the cryptographically generated data may be allocated to other users that are not contributors. For example, a portion of the cryptographically generated data may be allocated to a user associated with a certifier if that certifier also functions as a user device.

A minting block may contain further information. For example the minting block may contain a circulation status, indicating if or when the new quantity of the cryptographically generated data is to be removed from circulation. The circulation status is linked to a permission status of the contributor to which the biological dataset belongs. For example, if the permission status describes that the certifier is able to share the dataset with a third party (e.g. a research entity) then the cryptographically generated data tokens may be have no circulation deadline, whereas if the contributor has not given the certifier permission to share the dataset with the third party, then a circulation deadline may be tied to the new quantity of the cryptographically generated data.

At 550, the method comprises appending the minting block to the blockchain. Appending the minting block to the blockchain may comprise, for example, passing the information of the minting block to a data pool from which a node of the blockchain network can retrieve the information for inclusion in a block.

In examples in which the mint is a central mint, the minting block may contain a signature or other evidence that the central mint has created the minting block.

Figure 6:
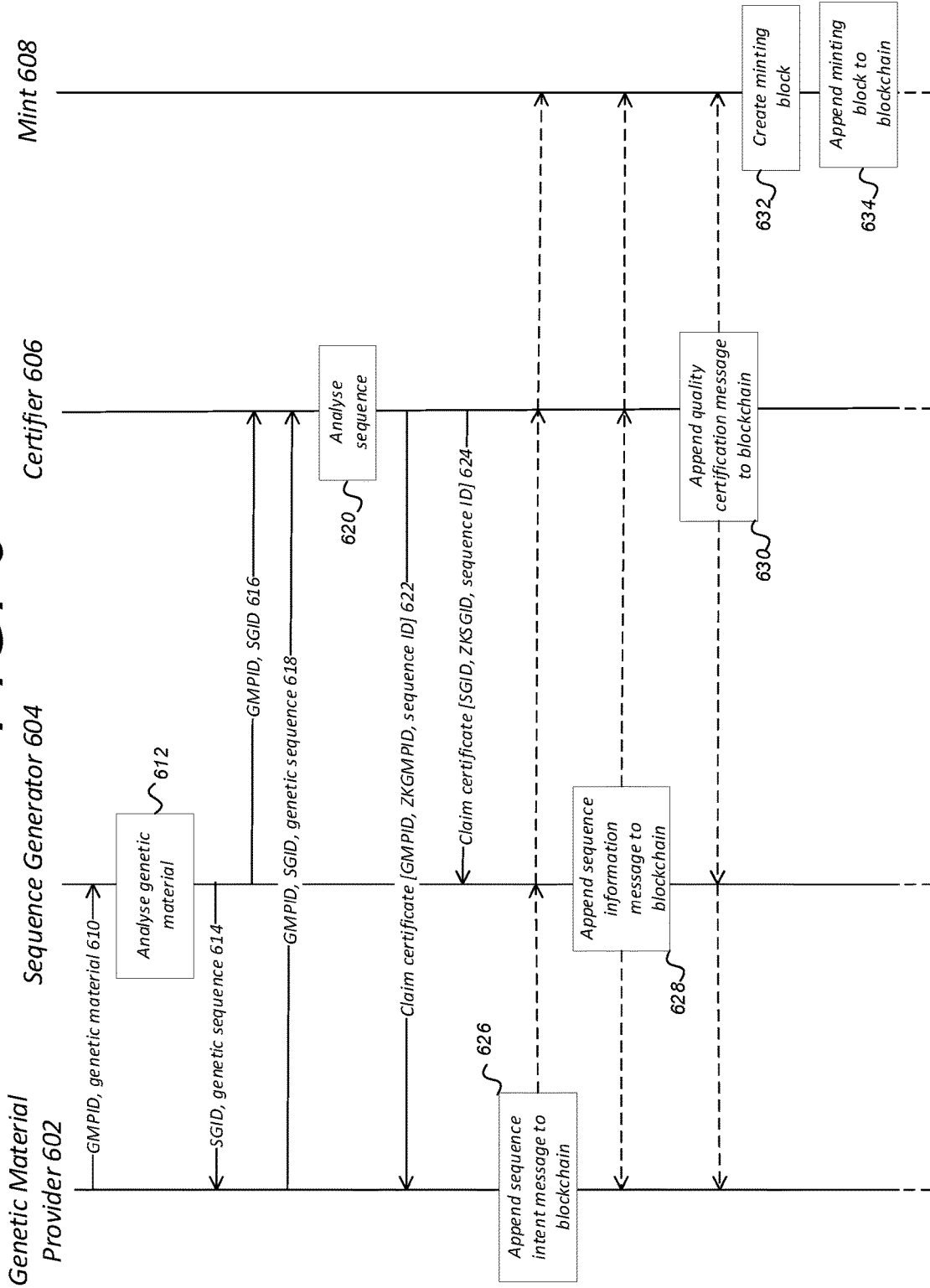
FIG. 6 shows a swimlane flowchart.

FIG. 6 shows a swimlane diagram of a minting process according to an example. In the example, the biological dataset comprises a polynucleotide sequence and, in particular, a genetic sequence. A first contributor to the provision of the biological dataset is the genetic material provider (GMP) 602 and a second contributor to the provision of the biological dataset is a sequence generator 604.

The swimlane diagram also shows the actions performed by a certifier 606. The certifier 606 may be one of a plurality of certifiers trusted by nodes of the blockchain network.

The swimlane diagram also shows the actions performed by a mint 608. The mint may be a computing device controlled by a central minting authority. Alternatively, if the blockchain network is decentralised, the mint may be a node of the blockchain network that is configured to perform the actions of the mint as a result of the blockchain protocol being performed.

The GMP 602 may be an individual or may be a research entity or some other repository that legally owns the genetic material.

At 610, the GMP 602 sends an identifier of the GMP (GMPID) and the genetic material to the sequence generator 604.

The sequence generator 604 may be a user or entity that has the relevant equipment to be able to derive a genetic sequence from the genetic material. For example, the sequence generator may use a nanopore sequencer. Transmembrane pores (e.g. nanopores) have been used to identify small molecules or folded proteins and to monitor chemical or enzymatic reactions at approximately the single molecule level. Such transmembrane pores have great potential as electrical biosensors for polymers and a variety of small molecules. Nanopore sequencers are useful for polynucleotide sequencing and biomarker recognition. Ion flow (for example, electron flow/current) through a nanopore may be measured under a potential difference applied across the nanopore. Interaction of an analyte with the nanopore can give rise to a characteristic change in ion flow (for example, a characteristic current profile) as the analyte translocates through the nanopore. This raw data in the form of ion flow/current signal information can be used to characterise the analyte. For example, a polynucleotide strand such as DNA may pass through the nanopore sequencer. DNA comprises nucleobases (cytosine, guanine, adenine and thymine) and, as a DNA segment passes through the nanopore sequencer, a resultant characteristic current profile will be produced depending on which of the nucleobases is passing through the sequencer at any given moment. The raw data output from a nanopore sequencer can be processed in order to derive a sequence of bases.

At 612, the genetic material is analysed to derive a genetic sequence. The sequence and an identifier of the sequence generator (SGID) are sent to the GMP 602 at 614. Similarly, the sequence generator 604 sends (616) the GMPID and SGID to the certifier 606.

At 618, the GMP 602 sends the GMPID, SGID and genetic sequence to the certifier 606. The GMP may send further information to the certifier, such as evidence of legal ownership of the genetic sequence and/or the genetic material from which the genetic material was derived.

The certifier 606 has accordingly received a genetic sequence and two identifiers identifying two contributing parties that contributed to the provision of the biological dataset.

At 620, the certifier 606 analyses the genetic sequence to determine one or more quality parameter values.

At 622, the certifier 606 sends a claim certificate to the GMP. At 624, the certifier 606 sends a claim certificate to the sequence generator.

At 626, the GMP 602 communicates a first contribution message (referred to in FIG. 6 as a "sequence intent" message) by causing a new block to be appended to the blockchain. The first contribution message announces to the mint that the anonymous credential(s) associated with the GMP 602 is associated with a genetic sequence, the genetic sequence identified by a unique dataset identifier also comprised within the contribution message. The first contribution message may also comprise a anonymous credential of the sequence generator 604.

At 628, the sequence generator 604 communicates a second contribution message (referred to in FIG. 6 as a "sequence info" message) by causing a new block to be appended to the blockchain. The second contribution message comprises an anonymous credential of the sequence generator 604 and also the dataset identifier that uniquely identifies the genetic sequence. The sequence information message may further comprise a anonymous credential of the GMP 602.

At 630, the certifier 606 communicates a quality certification message by causing a new block to be appended to the blockchain.

At 632, the mint 608, creates a minting block using a method substantially as described above in relation to FIG. 5.

At 634, the mint 608 causes the block to be appended to the blockchain.

Figure 7:
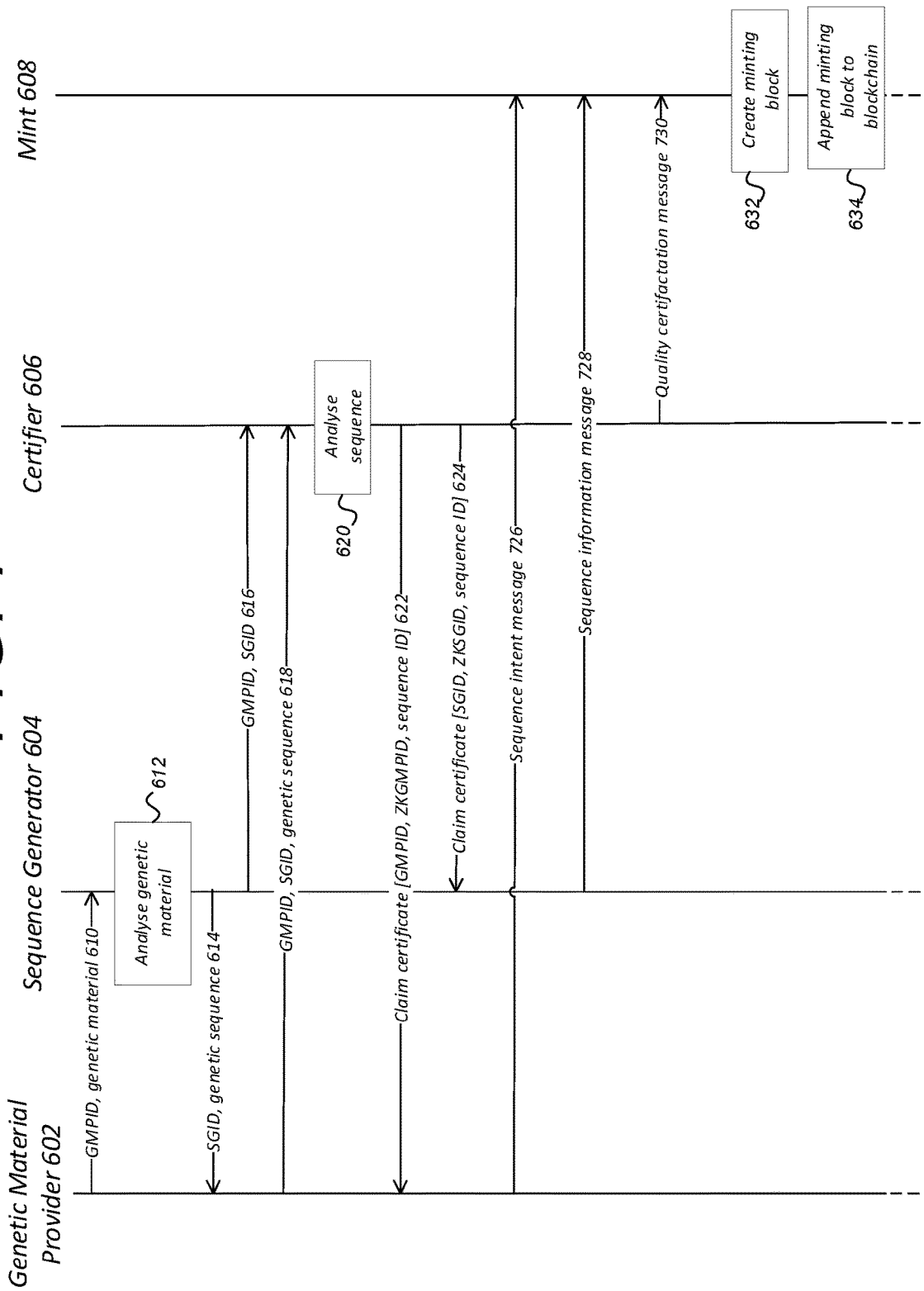
FIG. 7 shows a swimlane flowchart.

FIG. 7 shows a swimlane diagram of a minting process according to another example. The minting process shown in FIG. 7 is similar to that shown in FIG. 6 except for the way in which the contribution messages and quality certification message are communicated to the mint 708. Accordingly, steps 610 to 624 will not be described again for brevity.

At 726, the GMP 602 communicates a first contribution message (referred to in FIG. 7 as a "sequence intent" message) by transmitting the sequence intent message to the mint 708 off-chain.

At 728, the sequence generator 604 communicates a second contribution message (referred to in FIG. 7 as a "sequence info" message) by transmitting the sequence information message to the mint 708 off-chain.

At 730, the certifier 606 communicates a quality certification message by transmitting the quality certification message to the mint 708 off-chain.

Many variations of the methods described herein will be apparent to the skilled person.

A blockchain may include any form of electronic, computer-based, distributed ledger, including permissioned and un-permissioned ledgers, shared ledgers and variations thereof.

Each feature disclosed in this specification (including any accompanying claims, abstract and drawings), may be replaced by alternative features serving the same, equivalent or similar purpose, unless expressly disclosed otherwise. Thus, unless expressly disclosed otherwise, each feature disclosed is one example only of a generic series of equivalent or similar features.

The invention is not restricted to the details of any embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely these embodiments, but also any embodiments which fall within the scope of the claims.

The invention claimed is:

1. A method for performance by one or more user devices associated with users, wherein cryptographically generated data is supported by a blockchain through synchronization over peer-to-peer nodes, the method comprising:
sending, by the one or more user devices, a biological dataset to a certifier at a first time, the certifier trusted by nodes of the blockchain network, wherein one or more contributors contributed to the provision of the biological dataset;
sending, by the one or more user devices, a unique identifier of each of the one or more contributors of the biological dataset to the certifier;

receiving, by the one or more user devices and in response to sending the biological dataset and the unique identifier of each of the one or more contributors of the biological dataset, one or more claim certificates, each claim certificate associating the unique identifier of the corresponding contributor of the biological dataset with an anonymous credential of that contributor and a dataset identifier for uniquely identifying the biological dataset sent to the certifier, each claim certificate signed by the certifier, wherein each claim certificate allows the corresponding contributor to claim at least a portion of a newly minted block of cryptographically generated data; and communicating, directly or indirectly, one or more contribution messages to a mint, each contribution message indicates to the mint that the corresponding contributor has contributed to the provision of the biological dataset, the mint being configured to create a minting block and cause the minting block to be appended to the blockchain based, at least in part, on the one or more contribution messages, each contribution message comprising:

an anonymous credential of a contributor; and the dataset identifier of the biological dataset;

determining that at least a portion of a new unit of cryptographically generated data has been allocated to a contributor, the new unit of cryptographically generated data created partially in response to the communication of the one or more contribution messages; and providing a proof of possession of the claim certificate when spending a part of the at least a portion of the new unit of cryptographically generated data.

2. The method of claim 1, wherein causing one or more contribution messages to be communicated comprises appending one or more blocks to the blockchain, the one or more blocks comprising the one or more contribution messages.

3. The method of claim 2, further comprising accessing the blockchain to verify that the one or more contribution messages have been communicated.

4. The method of claim 1, wherein causing one or more contribution messages to be communicated comprises transmitting the one of more contribution messages to a central mint off-chain.

5. The method of claim 1, wherein the biological dataset comprises a genetic sequence and/or phenotype information.

6. A non-transitory computer-readable medium having instructions stored thereon, which when executed by a processor, causes the processor to:

send, by one or more user devices, a biological dataset to a certifier at a first time, the certifier trusted by nodes of the blockchain network, wherein one or more contributors contributed to the provision of the biological dataset;

send, by the one or more user devices, a unique identifier of each of the one or more contributors of the biological dataset to the certifier;

receive, by the one or more user devices and in response to sending the biological dataset and the unique identifier of each of the one or more contributors of the biological dataset, one or more claim certificates, each claim certificate associating the unique identifier of the corresponding contributor of the biological dataset with an anonymous credential of that contributor and a dataset identifier for uniquely identifying the biological dataset sent to the certifier, each claim certificate signed by the certifier, wherein each claim certificate allows the corresponding contributor to claim at least a portion of a newly minted block of cryptographically generated data; and communicate, directly or indirectly, one or more contribution messages to a mint, each contribution message indicates to the mint that the corresponding contributor has contributed to the provision of the biological dataset, the mint being configured to create a minting block and cause the minting block to be appended to the blockchain based, at least in part, on the one or more contribution messages, each contribution message comprising:

an anonymous credential of a contributor; and the dataset identifier of the biological dataset;

determine that at least a portion of a new unit of cryptographically generated data has been allocated to a contributor, the new unit of cryptographically generated data created partially in response to the communication of the one or more contribution messages; and provide a proof of possession of the claim certificate when spending a part of the at least a portion of the new unit of cryptographically generated data.

7. The non-transitory computer-readable medium of claim 6, wherein the instructions further cause the processor to:

append one or more blocks to the blockchain, the one or more blocks comprising the one or more contribution messages.

8. The non-transitory computer-readable medium of claim 7, wherein the instructions further cause the processor to:

access the blockchain to verify that the one or more contribution messages have been communicated.

9. The non-transitory computer-readable medium of claim 6, wherein the instructions further cause the processor to:

transmit the one of more contribution messages to a central mint off-chain.

10. The non-transitory computer-readable medium of claim 6, wherein the biological dataset comprises a genetic sequence and/or phenotype information.

11. A user device, comprising:

one or more processors; and one or more non-transitory machine readable storage media having instructions stored thereon which when processed by the one or more processors, cause the one or more processors to:

send a biological dataset to a certifier at a first time, the certifier trusted by nodes of the blockchain network, wherein one or more contributors contributed to the provision of the biological dataset;

send a unique identifier of each of the one or more contributors of the biological dataset to the certifier;

receive, by the user device and in response to sending the biological dataset and the unique identifier of each of the one or more contributors of the biological dataset, one or more claim certificates, each claim certificate associating the unique identifier of the corresponding contributor of the biological dataset with an anonymous credential of that contributor and a dataset identifier for uniquely identifying the biological dataset sent to the certifier, each claim certificate signed by the certifier, wherein each claim certificate allows the corresponding contributor to claim at least a portion of a newly minted block of cryptographically generated data; and communicate, directly or indirectly, one or more contribution messages to a mint, each contribution message indicates to the mint that the corresponding contributor has contributed to the provision of the biological dataset, the mint being configured to create a minting block and cause the minting block to be appended to the blockchain based, at least in part, on the one or more contribution messages, each contribution message comprising:
   an anonymous credential of a contributor; and
   the dataset identifier of the biological dataset;
determine that at least a portion of a new unit of cryptographically generated data has been allocated to a contributor, the new unit of cryptographically generated data created partially in response to the communication of the one or more contribution messages; and
provide a proof of possession of the claim certificate when spending a part of the at least a portion of the new unit of cryptographically generated data.

12. The user device of claim 11, wherein the one or more processors are further operable to:
   transmit the one of more contribution messages to a central mint off-chain.

13. The user device of claim 11, wherein the one or more processors are further operable to:
   append one or more blocks to the blockchain, the one or more blocks comprising the one or more contribution messages.

14. The user device of claim 11, wherein the biological dataset comprises a genetic sequence and/or phenotype information.

* * * * *